US012710672B2

(12) United States Patent
Tai et al.

(10) Patent No.: US 12,710,672 B2
(45) Date of Patent: Aug. 18, 2026

(54) LIQUID CRYSTAL DISPLAY AND SCREEN CLEARING METHOD THEREOF

(71) Applicant: Iris Optronics Co., Ltd., Tainan City (TW)

(72) Inventors: Ting Yu Tai, Tainan City (TW); Sheng Yao Wang, Tainan City (TW); Wu Chang Yang, Tainan City (TW); Chi Chang Liao, Tainan City (TW)

(73) Assignee: Iris Optronics Co., Ltd., Tainan City (TW)

( * ) Notice: Subject to any disclaimer, the term of this patent is extended or adjusted under 35 U.S.C. 154(b) by 0 days.

(21) Appl. No.: 18/901,062

(22) Filed: Sep. 30, 2024

(65) Prior Publication Data

US 2025/0116891 A1 Apr. 10, 2025

(30) Foreign Application Priority Data

Oct. 6, 2023 (TW) ................................ 112138373

(51) Int. Cl.
*G02F 1/133* (2006.01)

(52) U.S. Cl.
CPC ... *G02F 1/13306* (2013.01); *G09G 2310/063* (2013.01)

(58) Field of Classification Search
None
See application file for complete search history.

(56) References Cited

U.S. PATENT DOCUMENTS

| | | | | |
|---|---|---|---|---|
| 7,019,725 B1 * | 3/2006 | Lee | G09G 3/3648 345/98 |
| 9,978,333 B2 * | 5/2018 | Zhang | G09G 3/3611 |
| 2006/0145993 A1 | 7/2006 | Kitaoka | |
| 2011/0050678 A1 * | 3/2011 | Campbell | G09G 3/3629 345/214 |

FOREIGN PATENT DOCUMENTS

| | | |
|---|---|---|
| JP | H07253567 A | 10/1995 |
| TW | 200632828 A | 9/2006 |

* cited by examiner

*Primary Examiner* — Lucy P Chien
(74) *Attorney, Agent, or Firm* — CKC & Partners Co., LLC

(57) ABSTRACT

A liquid crystal display includes a display panel and a driving unit. The display panel includes a plurality of resetting sections, which correspond to display a plurality of screens, respectively. There is a first voltage difference between a corresponding one of the column voltages and a corresponding one of the row voltages of one of the resetting sections, and there is a second voltage difference between a corresponding one of the column voltages and a corresponding one of the row voltages of another of the resetting sections. The second voltage difference reaching a second maximum voltage difference value is after the first voltage difference reaching a first maximum voltage difference value by a delay time, so as to clear the screens.

12 Claims, 12 Drawing Sheets

LIQUID CRYSTAL DISPLAY AND SCREEN CLEARING METHOD THEREOF

RELATED APPLICATIONS

This application claims priority to Taiwan Application Serial Number 112138373, filed on Oct. 6, 2023, which is herein incorporated by reference.

BACKGROUND

Technical Field

The present disclosure relates to a liquid crystal display and a screen clearing method thereof. More particularly, the present disclosure relates to a liquid crystal display and a screen clearing method thereof that are advantageous in reducing inrush current.

Description of Related Art

Driven by human beings' pursuit of convenient life, various display technologies and devices have been developed, such as cholesteric liquid crystal display (ChLCD), which is used in electronic paper, electronic signage, etc. When the liquid crystal display clears the screen, the power system outputs the maximum voltage to complete the process. However, when the voltage is output, an excessive inrush current may be generated due to a large load, so that the power system may operate abnormally, and the liquid crystal display cannot be cleared completely.

Thus, how to develop a liquid crystal display and a screen clearing method thereof, which can suppress the inrush current or reduce the energy of the inrush current, so that the power system and the liquid crystal display are not affected by the inrush current, has become an important topic in today's market.

SUMMARY

According to one aspect of the present disclosure, a liquid crystal display is provided. The liquid crystal display includes a display panel and a driving unit. The display panel includes a plurality of resetting sections, which correspond to display a plurality of screens, respectively. The driving unit is configured for outputting a plurality of column voltages and a plurality of row voltages, and the column voltages and the row voltages correspondingly cooperate to drive the resetting sections, respectively. There is a first voltage difference between a corresponding one of the column voltages and a corresponding one of the row voltages of one of the resetting sections, and there is a second voltage difference between a corresponding one of the column voltages and a corresponding one of the row voltages of another of the resetting sections. The second voltage difference reaching a second maximum voltage difference value is after the first voltage difference reaching a first maximum voltage difference value by a delay time, so as to clear the screens.

According to another aspect of the present disclosure, a screen clearing method of a liquid crystal display is provided. The screen clearing method of the liquid crystal display includes: configuring a display panel of the liquid crystal display to a plurality of resetting sections, which correspond to display a plurality of screens, respectively, wherein a plurality of column voltages and a plurality of row voltages correspondingly cooperate to drive the resetting sections, respectively; forming a first voltage difference between a corresponding one of the column voltages and a corresponding one of the row voltages of one of the resetting sections, and causing the first voltage difference to reach a first maximum voltage difference value; forming a second voltage difference between a corresponding one of the column voltages and a corresponding one of the row voltages of another of the resetting sections, and causing the second voltage difference to reach a second maximum voltage difference value, wherein reaching the second maximum voltage difference value is after reaching the first maximum voltage difference value by a delay time; and clearing the screens by reaching the first maximum voltage difference value and the second maximum voltage difference value.

According to further another aspect of the present disclosure, a screen clearing method of a liquid crystal display is provided. The screen clearing method of the liquid crystal display includes: configuring a display panel of the liquid crystal display to a plurality of resetting sections, which correspond to display a plurality of screens, respectively, wherein a plurality of column voltages and a plurality of row voltages correspondingly cooperate to drive the resetting sections, respectively; forming a first voltage difference between a corresponding one of the column voltages and a corresponding one of the row voltages of one of the resetting sections, and causing the first voltage difference to reach at least one first step voltage difference value before reaching a first maximum voltage difference value; forming a second voltage difference between a corresponding one of the column voltages and a corresponding one of the row voltages of another of the resetting sections, and causing the second voltage difference to reach a second maximum voltage difference value, wherein reaching the second maximum voltage difference value is after reaching the first maximum voltage difference value by a delay time, and the second voltage difference reaches at least one second step voltage difference value before reaching the second maximum voltage difference value; and clearing the screens by reaching the first maximum voltage difference value and the second maximum voltage difference value.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
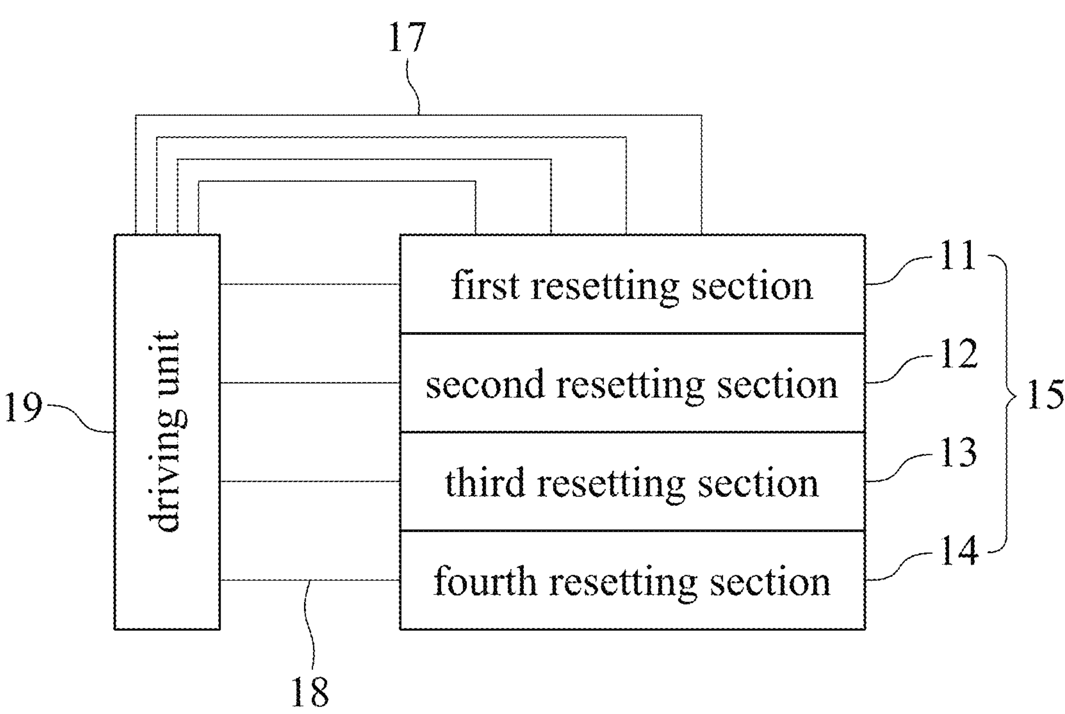
FIG. 1A is a schematic view of a cholesteric liquid crystal display according to the first embodiment of the present disclosure.

Embodiments of the present disclosure will be described below with reference to the drawings. For the sake of clarity, many practical details will be explained together in the following statements. However, it should be understood that these practical details should not be used to limit the present disclosure. That is, these practical details are not necessary in embodiments of the present disclosure. In addition, for the sake of simplifying the drawings, some commonly used structures and components are shown in the drawings in a simple schematic manner; and repeated components may be represented by the same numbers.

In addition, the terms first, second, etc. are used herein to describe various elements or components, these elements or components should not be limited by these terms. Consequently, a first element or component discussed below could be termed a second element or component. Moreover, the combination of components in the present disclosure is not a combination that is generally known, conventional or customary in this field. The components themselves being or being not common knowledge cannot be used to determine whether the combination relationship can be easily completed by a person skilled in the technical field.

FIG. 1A is a schematic view of a cholesteric liquid crystal display according to the first embodiment of the present disclosure. With reference to FIG. 1A, the liquid crystal display (LCD, LCD monitor) of the present disclosure can be, for example but not limited to, a cholesteric liquid crystal display 10, which includes a display panel 15 and a driving unit 19. The display panel 15 includes a plurality of resetting sections, e.g., a first resetting section 11, a second resetting section 12. Each of the first resetting section 11 and the second resetting section 12 includes a plurality of pixel matrices, so that the first resetting section 11 and the second resetting section 12 correspond to display a plurality of screens (images), respectively.

Figure 1B:
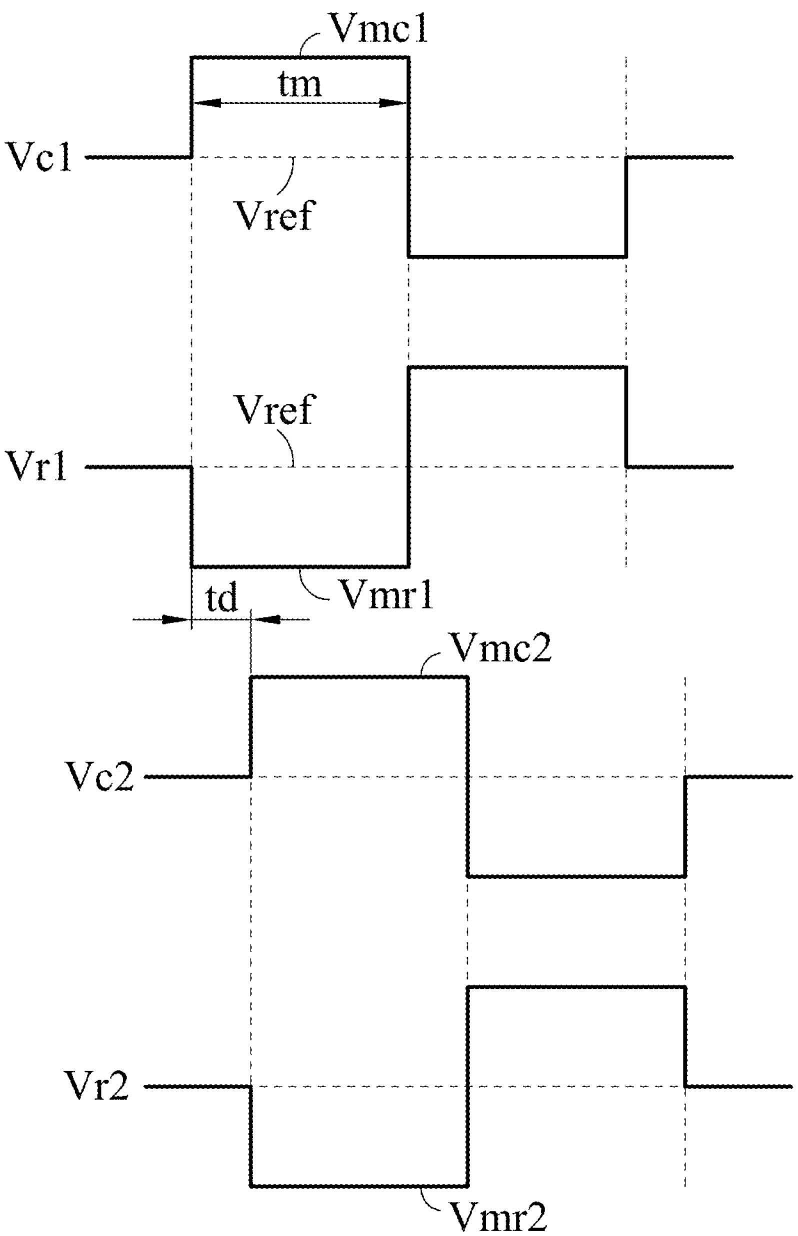
FIG. 1B is a schematic view of column voltages and row voltages of partial resetting sections of the cholesteric liquid crystal display of the first embodiment.

FIG. 1B is a schematic view of column voltages and row voltages of partial resetting sections of the cholesteric liquid crystal display of the first embodiment. With reference to FIG. 1B, the driving unit 19 is configured for outputting column voltages (column driving voltages) Vc1, Vc2 and row voltages (row driving voltages) Vr1, Vr2. The column voltage Vc1 via a column driving line 17 and the row voltage Vr1 via a row driving line 18 correspondingly cooperate to drive the first resetting section 11, and the column voltage Vc2 via the column driving line 17 and the row voltage Vr2 via the row driving line 18 correspondingly cooperate to drive the second resetting section 12. There is a first voltage difference (i.e., |Vc1−Vr1|) between the column voltage Vc1 and the row voltage Vr1 of the first resetting section 11, and there is a second voltage difference (i.e., |Vc2−Vr2|) between the column voltage Vc2 and the row voltage Vr2 of the second resetting section 12. The second voltage difference reaching a second maximum voltage difference value is after (later than) the first voltage difference reaching a first maximum voltage difference value by a delay time td, and a maximum voltage difference duration tm of the first maximum voltage difference value and a maximum voltage difference duration tm of the second maximum voltage difference value partially overlap, so as to clear (reset) the corresponding screens of the first resetting section 11 and the second resetting section 12, respectively. Therefore, the screen corresponding to the second resetting section 12 is cleared in a very short time after the screen corresponding to the first resetting section 11 being cleared, and the inrush current is suppressed by time division and section division, so that the screens can be completely cleared and normally display, the cholesteric liquid crystal display 10 normally operates, and no additional parts are needed to meet the demand of low cost.

In detail, at least one of the first maximum voltage difference value and the second maximum voltage difference value may be a homeotropic voltage. Therefore, it is advantageous in effectively clearing the screen corresponding to the resetting section. In the first embodiment, the first maximum voltage difference value and the second maximum voltage difference value are both homeotropic voltages. According to other embodiments of the present disclosure, each maximum voltage difference value may be greater than, less than, or equal to the homeotropic voltage, and the screen corresponding to the resetting section can be cleared with an appropriate maximum voltage difference duration tm.

The first maximum voltage difference value is a difference between a first maximum column voltage value Vmc1 and a first maximum row voltage value Vmr1 at the same time point, and the first maximum column voltage value Vmc1 and the first maximum row voltage value Vmr1 relative to the reference voltage value Vref (e.g., 0 volt) may have different signs. The second maximum voltage difference value is a difference between a second maximum column voltage value Vmc2 and a second maximum row voltage value Vmr2 at the same time point, and the second maximum column voltage value Vmc2 and the second maximum row voltage value Vmr2 relative to the reference voltage value Vref may have different signs. Furthermore, the reference voltage value Vref of the column voltage Vc1 and the reference voltage value Vref of the row voltage Vr1 may be the same (e.g., 0 volt) of different. Moreover, the absolute value of the difference between the first maximum column voltage value Vmc1 and the reference voltage value Vref may be the same as or different from the absolute value of the difference between the first maximum row voltage value Vmr1 and the reference voltage value Vref. The absolute value of the difference between each of the first maximum column voltage value Vmc1, the first maximum row voltage value Vmr1, the second maximum column voltage value Vmc2 and the second maximum row voltage value Vmr2 and the reference voltage value Vref is a half of the homeotropic voltage. Therefore, it is beneficial to provide design convenience of the driving voltage. In the first embodiment, the column voltage Vc1 and the row voltage Vr1 have opposite waveforms to each other, the column voltage Vc2 and the row voltage Vr2 have opposite waveforms to each other, the waveforms of the column voltages Vc1, Vc2 are the same, and the waveform of the column voltage Vc2 has the delay time td relative to the waveform of the column voltage Vc1.

Figure 1C:
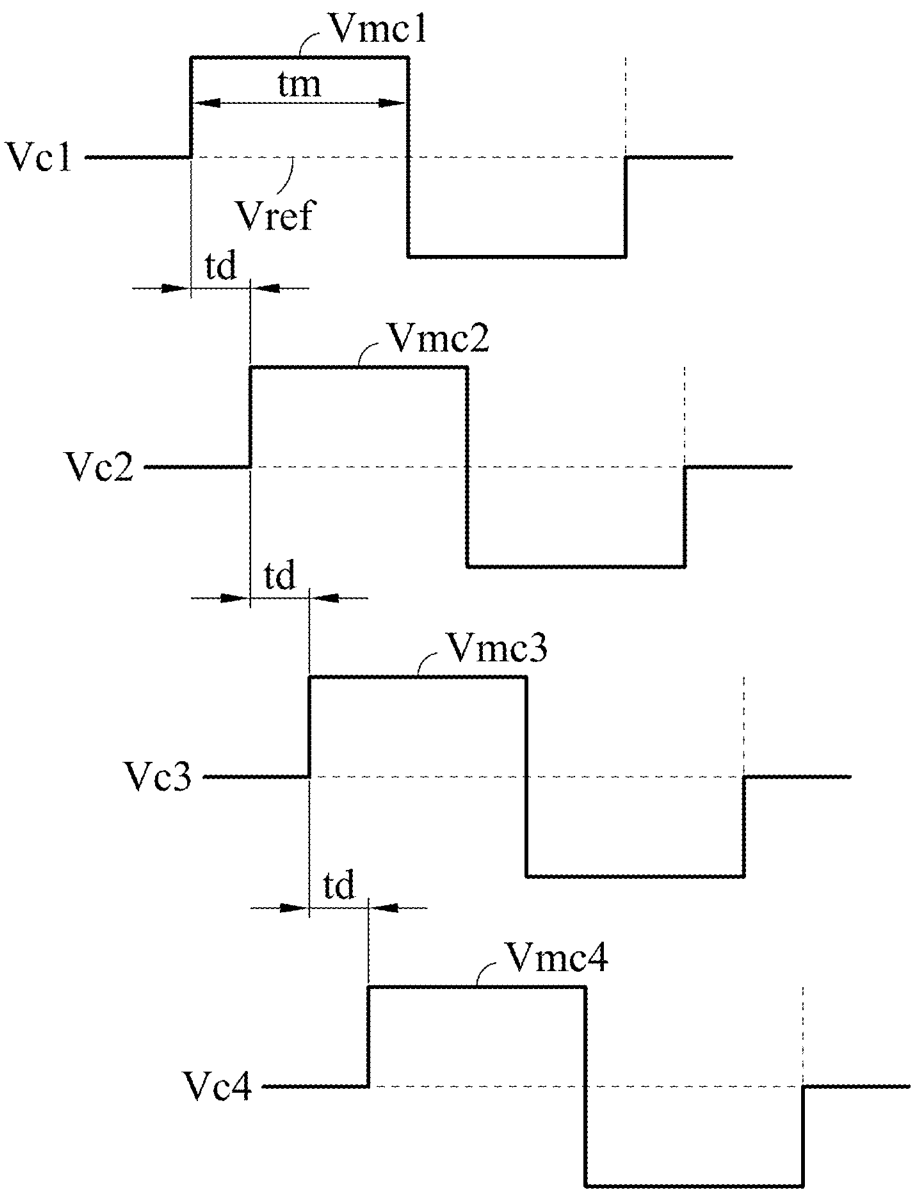
FIG. 1C is a schematic view of a column voltage of the cholesteric liquid crystal display of the first embodiment.

FIG. 1C is a schematic view of a column voltage of the cholesteric liquid crystal display of the first embodiment. With reference to FIG. 1C, the display panel 15 further includes a third resetting section 13 and a fourth resetting section 14, and the number and arrangement of the resetting sections according to the present disclosure are not limited to those disclosed in the drawings. Each of the third resetting section 13 and the fourth resetting section 14 includes a plurality of pixel matrices, and the third resetting section 13 and the fourth resetting section 14 correspond to display two screens, respectively. Therefore, the display panel 15 according to the present disclosure may include at least four resetting sections. The power supply sequences of the resetting sections of any sizes may be set with the same or different (independent) delay time td, which is the resetting section delay time to achieve an asynchronous time division power-on mode to disperse the power supply sequence for driving the display panel 15 to avoid driving an excessive load and generating a inrush current that the cholesteric liquid crystal display 10 cannot withstand, resulting in power supply errors in the control system, or the display panel 15 being not cleared and/or abnormal display.

The driving unit 19 is further configured for outputting column voltages Vc3, Vc4 and two row voltages. The column voltage Vc3 and one of the row voltages correspondingly cooperate to drive the third resetting section 13, and the column voltage Vc4 and the other of the row voltages correspondingly cooperate to drive the fourth resetting section 14. There is a third voltage difference between the column voltage Vc3 and the one of the row voltages of the third resetting section 13, and there is a fourth voltage difference between the column voltage Vc4 and the other of the row voltages of the fourth resetting section 14. The third voltage difference reaching a third maximum voltage difference value is after the second voltage difference reaching the second maximum voltage difference value by the delay time td, and the fourth voltage difference reaching a fourth maximum voltage difference value is after the third voltage difference reaching the third maximum voltage difference value by the delay time td. Furthermore, the first voltage difference, the second voltage difference, the third voltage difference and the fourth voltage difference sequentially reach the first maximum voltage difference value, the second maximum voltage difference value, the third maximum voltage difference value and the fourth maximum voltage difference value by the same or different delay time td, and the first maximum voltage difference value, the second maximum voltage difference value, the third maximum voltage difference value and the fourth maximum voltage difference value are maintained in the active reset phase of the maximum voltage difference duration tm, so as to clear the screens of the cholesteric liquid crystal display 10. In addition, the contents of the aforementioned first resetting section 11 and the second resetting section 12 may be referred for other details of the third resetting section 13 and the fourth resetting section 14, and the other details will not be described herein.

Figure 1D:
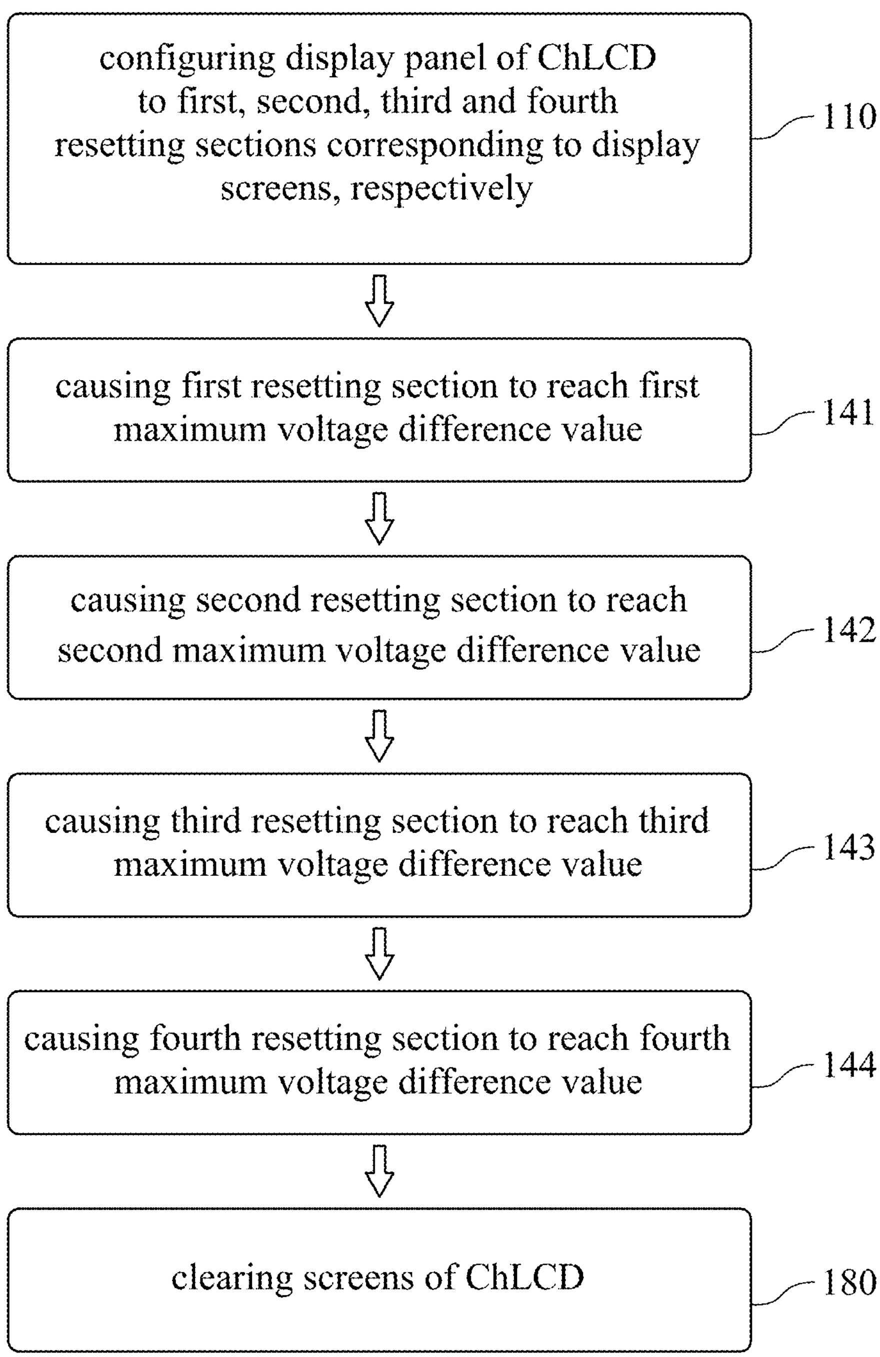
FIG. 1D is a flow chart of a screen clearing method of the cholesteric liquid crystal display of the first embodiment.

FIG. 1D is a flow chart of a screen clearing method of the cholesteric liquid crystal display of the first embodiment. With reference to FIG. 1D, the screen clearing method 100 of the cholesteric liquid crystal display 10 includes steps 110, 141, 142, 143, 144, 180.

The step 110 includes configuring the display panel 15 of the cholesteric liquid crystal display 10 to the first resetting section 11, the second resetting section 12, the third resetting section 13 and the fourth resetting section 14.

The step 141 includes forming the first voltage difference between the corresponding column voltage Vc1 and the corresponding row voltage Vr1, and causing the first voltage difference to reach the first maximum voltage difference value.

The step 142 includes forming the second voltage difference between the corresponding column voltage Vc2 and the corresponding row voltage Vr2, and causing the second voltage difference to reach the second maximum voltage difference value. Reaching the second maximum voltage difference value of the first time is after reaching the first maximum voltage difference value of the first time by the delay time td.

The step 143 includes forming the third voltage difference between the corresponding column voltage Vc3 and the corresponding row voltage, and causing the third voltage difference to reach the third maximum voltage difference value. Reaching the third maximum voltage difference value of the first time is after reaching the second maximum voltage difference value of the first time by the delay time td.

The step 144 includes forming the fourth voltage difference between the corresponding column voltage Vc4 and the corresponding row voltage, and causing the fourth voltage difference to reach the fourth maximum voltage difference value. Reaching the fourth maximum voltage difference value of the first time is after reaching the third maximum voltage difference value of the first time by the delay time td.

Furthermore, with reference to FIG. 1B and FIG. 1C, each of the first voltage difference reaching the first maximum voltage difference value, the second voltage difference reaching the second maximum voltage difference value, the third voltage difference reaching the third maximum voltage difference value and the fourth voltage difference reaching the fourth maximum voltage difference value may be periodically executed a plurality of times. Therefore, it ensures completely clearing the screens and reducing the inrush current. In the first embodiment, the fourth voltage difference reaching the fourth maximum voltage difference value of the first time is before (earlier than) the first voltage difference reaching the first maximum voltage difference value of the second time, and the present disclosure is not limited thereto.

For reaching the first maximum voltage difference value, the second maximum voltage difference value, the third maximum voltage difference value and the fourth maximum voltage difference value of the plurality of times, each of the first maximum column voltage value Vmc1, the first maximum row voltage value Vmr1, the second maximum column voltage value Vmc2, the second maximum row voltage value Vmr2, the third maximum column voltage value Vmc3, the third maximum row voltage value, the fourth maximum column voltage value Vmc4 and the fourth maximum row voltage value relative to the reference voltage value Vref may be positive and negative signs alternately. Therefore, it is beneficial to completely clear the screens and reduce the complexity of the circuit design.

The step 180 includes clearing the screens of the cholesteric liquid crystal display 10 by reaching the first maximum voltage difference value, the second maximum voltage difference value, the third maximum voltage difference value and the fourth maximum voltage difference value.

Figure 2A:
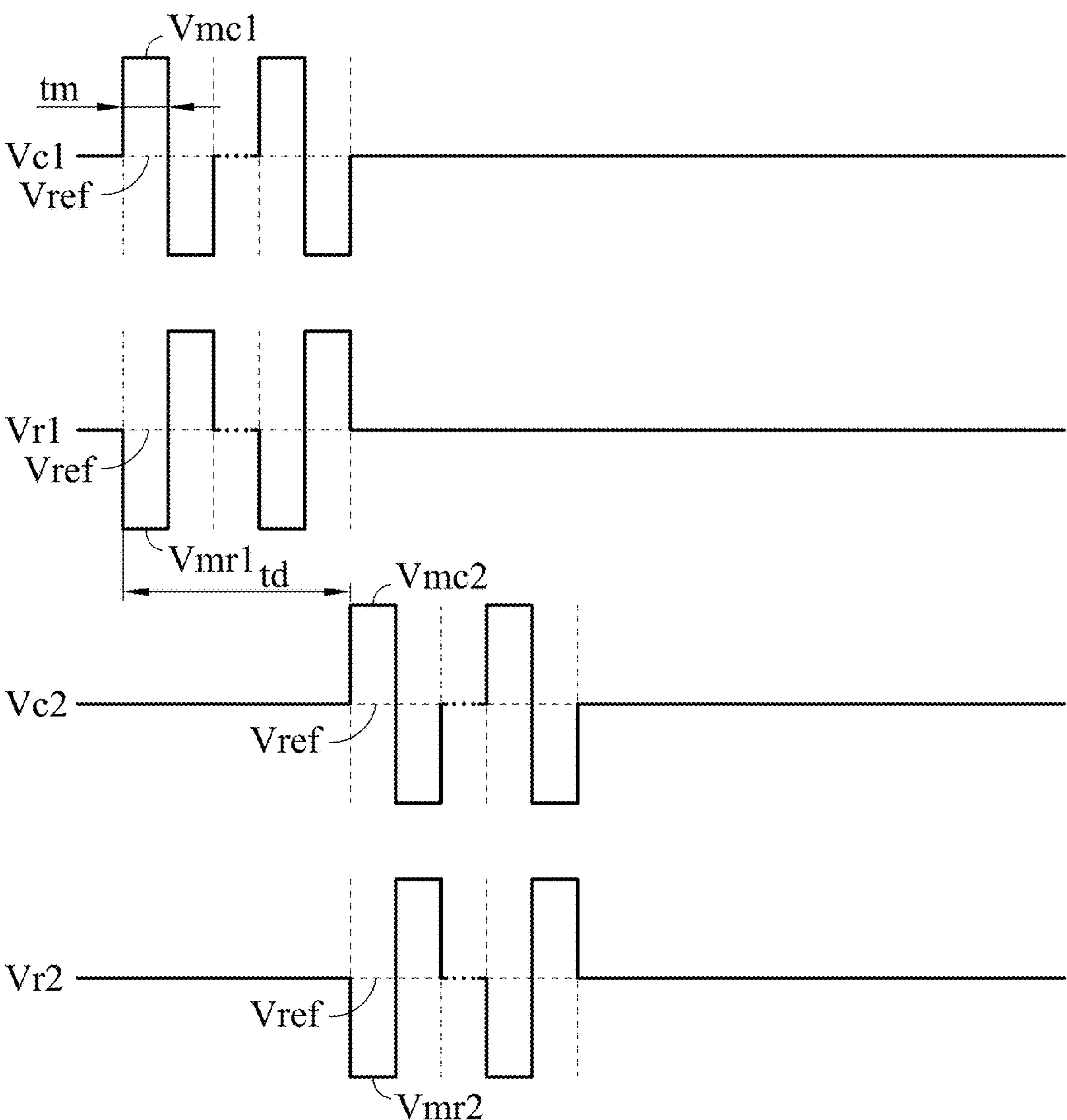
FIG. 2A is a schematic view of column voltages and row voltages of partial resetting sections of a cholesteric liquid crystal display according to the second embodiment of the present disclosure.
Figure 2B:
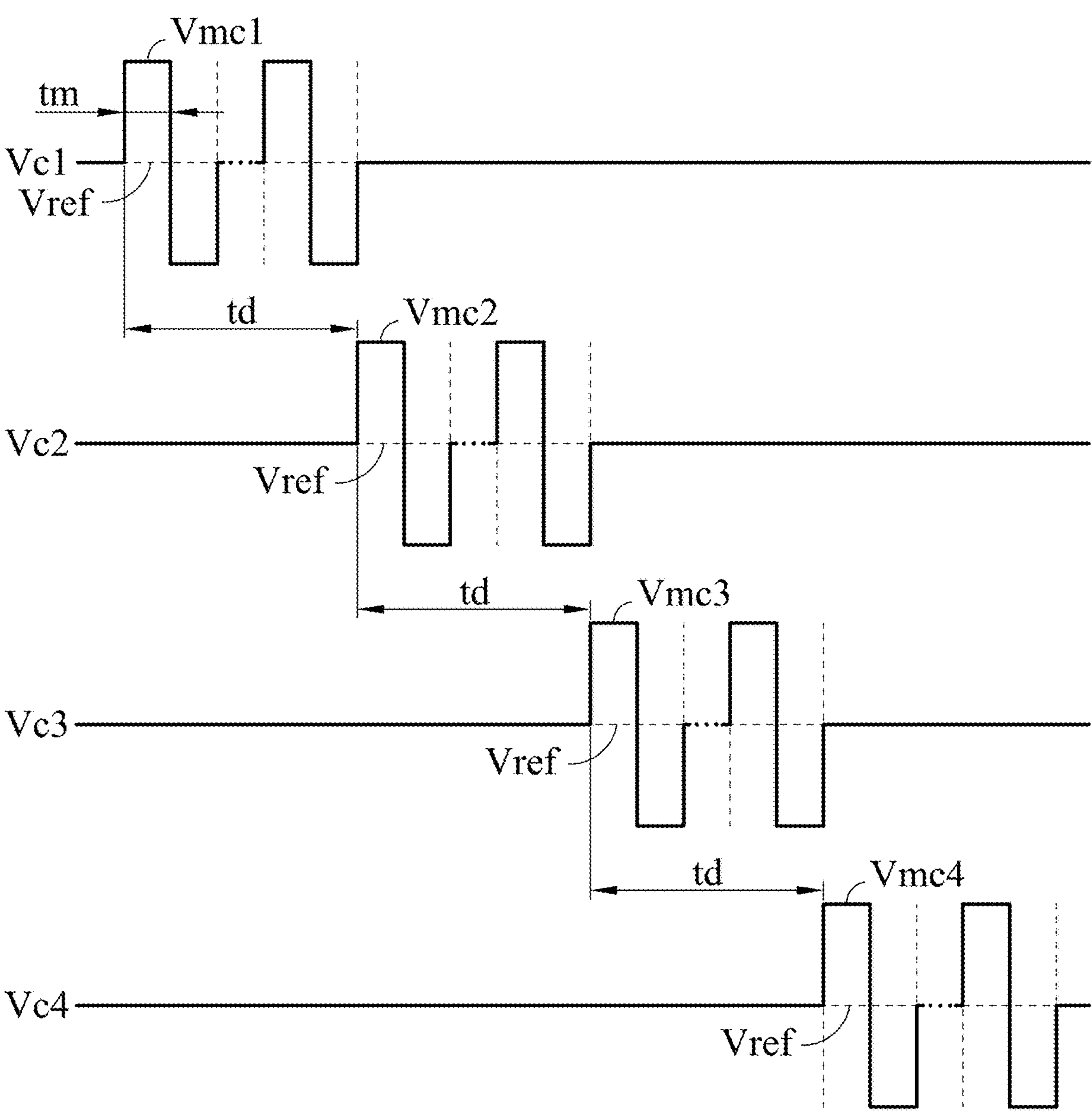
FIG. 2B is a schematic view of a column voltage of the cholesteric liquid crystal display of the second embodiment.
Figure 2C:
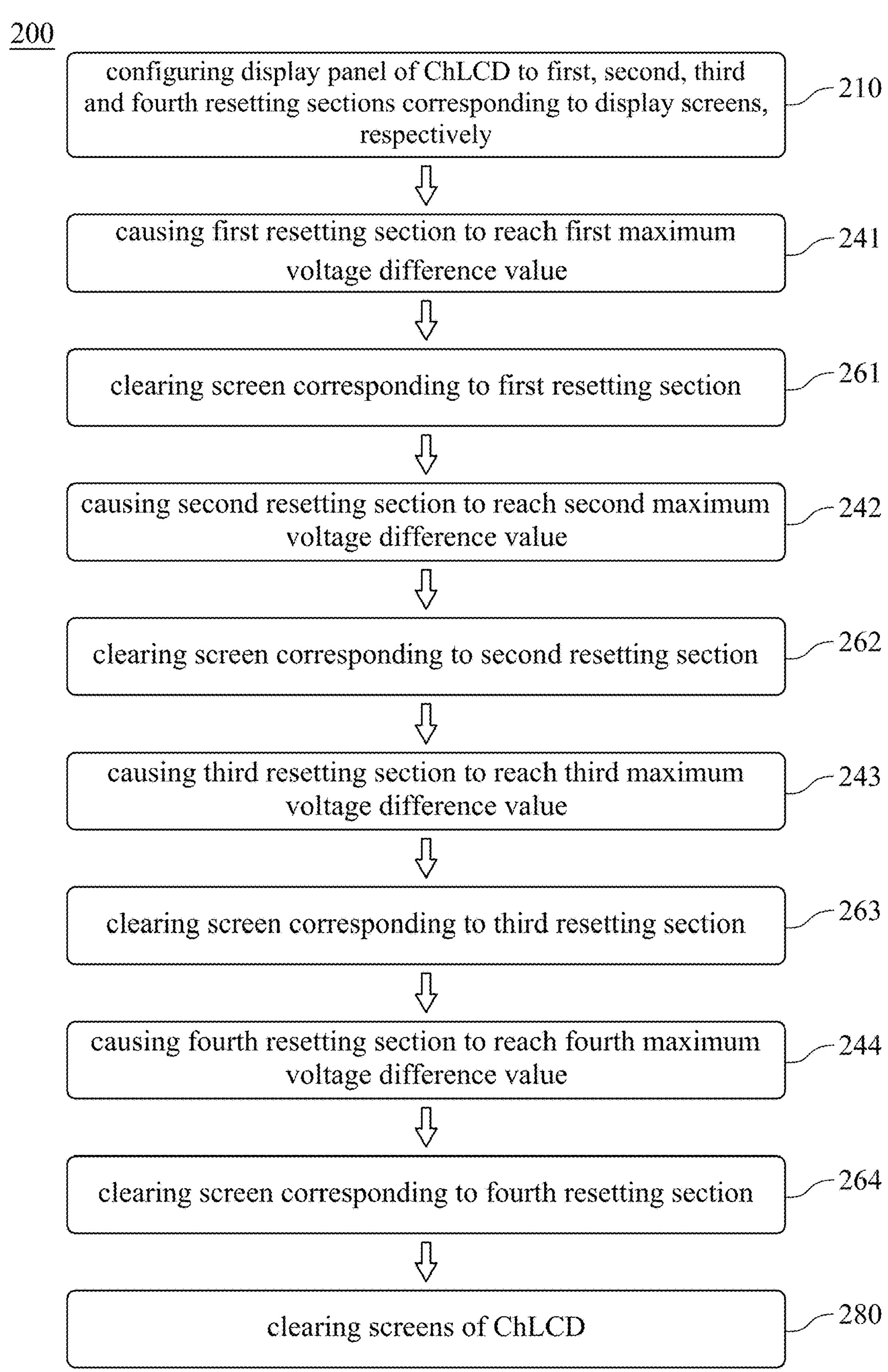
FIG. 2C is a flow chart of a screen clearing method of the cholesteric liquid crystal display of the second embodiment.

FIG. 2A is a schematic view of column voltages and row voltages of partial resetting sections of a cholesteric liquid crystal display according to the second embodiment of the present disclosure, FIG. 2B is a schematic view of a column voltage of the cholesteric liquid crystal display of the second embodiment, and FIG. 2C is a flow chart of a screen clearing method of the cholesteric liquid crystal display of the second embodiment. With reference to FIG. 2A to FIG. 2C, the screen clearing method 200 of the cholesteric liquid crystal display specifically includes steps 210, 241, 261, 242, 262, 243, 263, 244, 264, 280.

The step 210 includes configuring the display panel of the cholesteric liquid crystal display to the first resetting section, the second resetting section, the third resetting section and the fourth resetting section. The contents of the aforementioned first embodiment may be referred for other details of first resetting section, the second resetting section, the third resetting section and the fourth resetting section of the second embodiment, and the other details will not be described herein.

The step 241 includes forming the first voltage difference between the corresponding column voltage Vc1 and the corresponding row voltage Vr1, and causing the first voltage difference to periodically reach the first maximum voltage difference value a plurality of times. The step 261 includes clearing the screen corresponding to the first resetting section.

The step 242 includes forming the second voltage difference between the corresponding column voltage Vc2 and the corresponding row voltage Vr2, and causing the second voltage difference to reach the second maximum voltage difference value. Reaching the second maximum voltage difference value of the first time is after reaching the first maximum voltage difference value of the first time by the delay time td, and the second voltage difference reaching the second maximum voltage difference value are periodically executed a plurality of times. The step 262 includes clearing the screen corresponding to the second resetting section.

In other words, in the second embodiment, the screen corresponding to the first resetting section being cleared by reaching the first maximum voltage difference value (the step 261) is before the second voltage difference value reaching the second maximum voltage difference value of the first time (the step 242). Therefore, the display panel driving design is divided into multiple resetting sections or at least four resetting sections to use small sections for clearing, so that the power supply only needs to clear one small section of the display panel at one time, thus avoiding driving an excessively large load at one time to generate excessive inrush current, power supply errors of the control system, display panel failure to clear and/or abnormal display. In addition, the delay time td of the screen clearing method 200 is greater than the delay time td of the screen clearing method 100.

The step 243 includes forming the third voltage difference between the corresponding column voltage Vc3 and the corresponding row voltage, and causing the third voltage difference to reach the third maximum voltage difference value. Reaching the third maximum voltage difference value of the first time is after reaching the second maximum voltage difference value of the first time by the delay time td, and the third voltage difference reaching the third maximum voltage difference value are periodically executed a plurality of times. The step 263 includes clearing the screen corresponding to the third resetting section.

The step 244 includes forming the fourth voltage difference between the corresponding column voltage Vc4 and the corresponding row voltage, and causing the fourth voltage difference to reach the fourth maximum voltage difference value. Reaching the fourth maximum voltage difference value of the first time is after reaching the third maximum voltage difference value of the first time by the delay time td, and the fourth voltage difference reaching the fourth maximum voltage difference value are periodically executed a plurality of times. The step 264 includes clearing the screen corresponding to the fourth resetting section.

Furthermore, for reaching the first maximum voltage difference value, the second maximum voltage difference value, the third maximum voltage difference value and the fourth maximum voltage difference value of the plurality of times, each of the first maximum column voltage value Vmc1, the first maximum row voltage value Vmr1, the second maximum column voltage value Vmc2, the second maximum row voltage value Vmr2, the third maximum column voltage value Vmc3, the third maximum row voltage value, the fourth maximum column voltage value Vmc4 and the fourth maximum row voltage value relative to the reference voltage value Vref is positive and negative signs alternately.

The step 280 includes clearing the screens of the cholesteric liquid crystal display 10 by reaching the first maximum voltage difference value, the second maximum voltage difference value, the third maximum voltage difference value and the fourth maximum voltage difference value after sequentially executing the aforementioned step 210 to step 264. In other embodiment (not shown) according to the present disclosure, the screens of the cholesteric liquid crystal display can be cleared by combining the aforementioned screen clearing methods 100, 200.

Figure 3A:
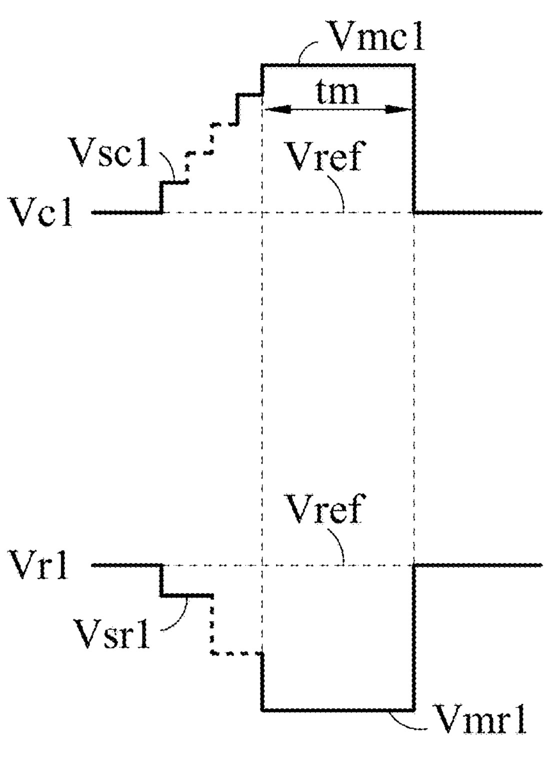
FIG. 3A is a schematic view of a column voltage and a row voltage of a cholesteric liquid crystal display according to the third embodiment of the present disclosure.
Figure 3B:
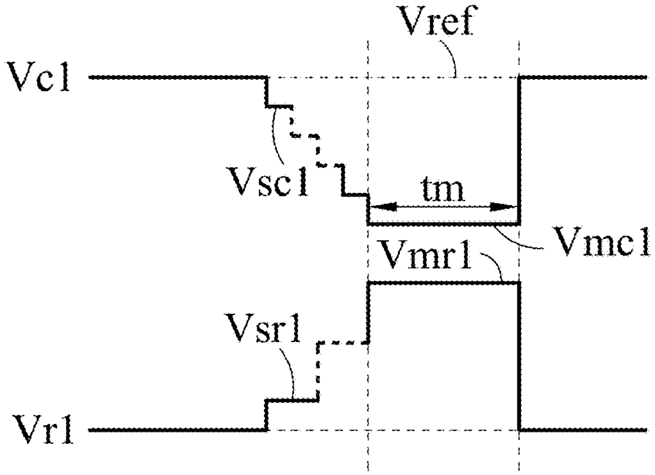
FIG. 3B is a schematic view of another column voltage and another row voltage of the cholesteric liquid crystal display of the third embodiment.
Figure 3C:
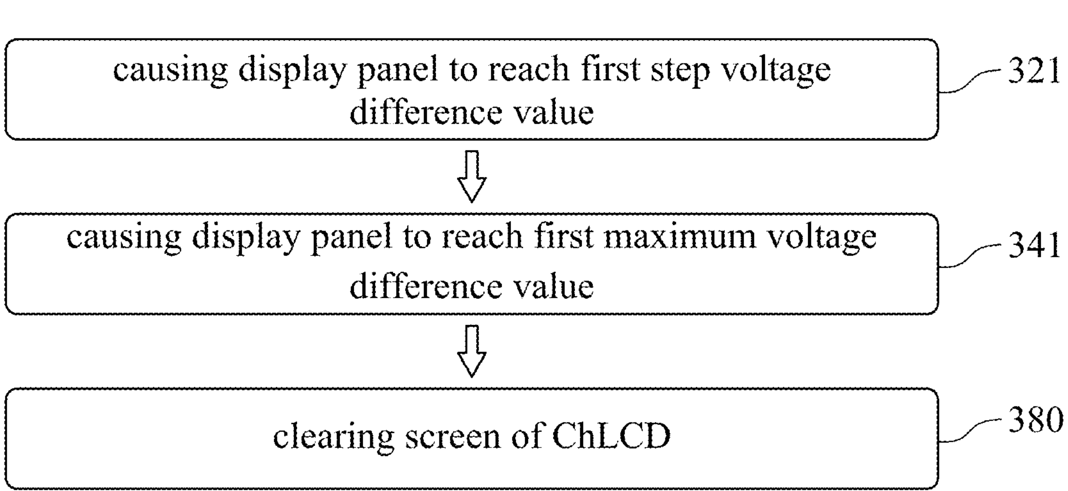
FIG. 3C is a flow chart of a screen clearing method of the cholesteric liquid crystal display of the third embodiment.

FIG. 3A is a schematic view of a column voltage and a row voltage of a cholesteric liquid crystal display according to the third embodiment of the present disclosure, FIG. 3B is a schematic view of another column voltage and another row voltage of the cholesteric liquid crystal display of the third embodiment, and FIG. 3C is a flow chart of a screen clearing method of the cholesteric liquid crystal display of the third embodiment. With reference to FIG. 3A to FIG. 3C, the screen clearing method 300 of the cholesteric liquid crystal display specifically includes steps 321, 341, 380, and the display panel of the cholesteric liquid crystal display of the third embodiment may be or may not be configured to a plurality of resetting sections.

The step 321 includes forming the first voltage difference between the column voltage Vc1 and the row voltage Vr1 of the display panel, and causing the first voltage difference to reach at least one first step voltage difference value. Specifically, the step 321 includes causing the first voltage difference to sequentially reach a plurality of first step voltage difference values.

Furthermore, each of the first step voltage difference values is a difference between the first column step voltage value Vsc1 and the first row step voltage value Vsr1 at the same time point, and a number of steps of the first column step voltage values Vsc1 and a number of steps of the first row step voltage values Vsr1 may be the same or different. Therefore, it is advantageous in improving the flexibility of the circuit design.

The step 341 includes causing the first voltage difference to reach the first maximum voltage difference value, and the first voltage difference reaches the first step voltage difference values (the step 321) before reaching the first maximum voltage difference value. Furthermore, the step 341 may further include, after the first maximum voltage difference value being maintained for the maximum voltage difference duration tm, causing the first voltage difference to reach the plurality of first step voltage difference values in reverse order and then reaches the reference voltage value Vref. The step 380 includes clearing the screen of cholesteric liquid crystal display by reaching the first maximum voltage difference value. Therefore, the multi-stage stepping manner is used to drive two electrode ends, the column end and row end, of the display panel, so that the voltage difference reaches the homeotropic voltage to perform the clearing action, which can reduce the inrush current and effectively avoid stopping the clearing action or causing the screen to be unclear.

Figure 4A:
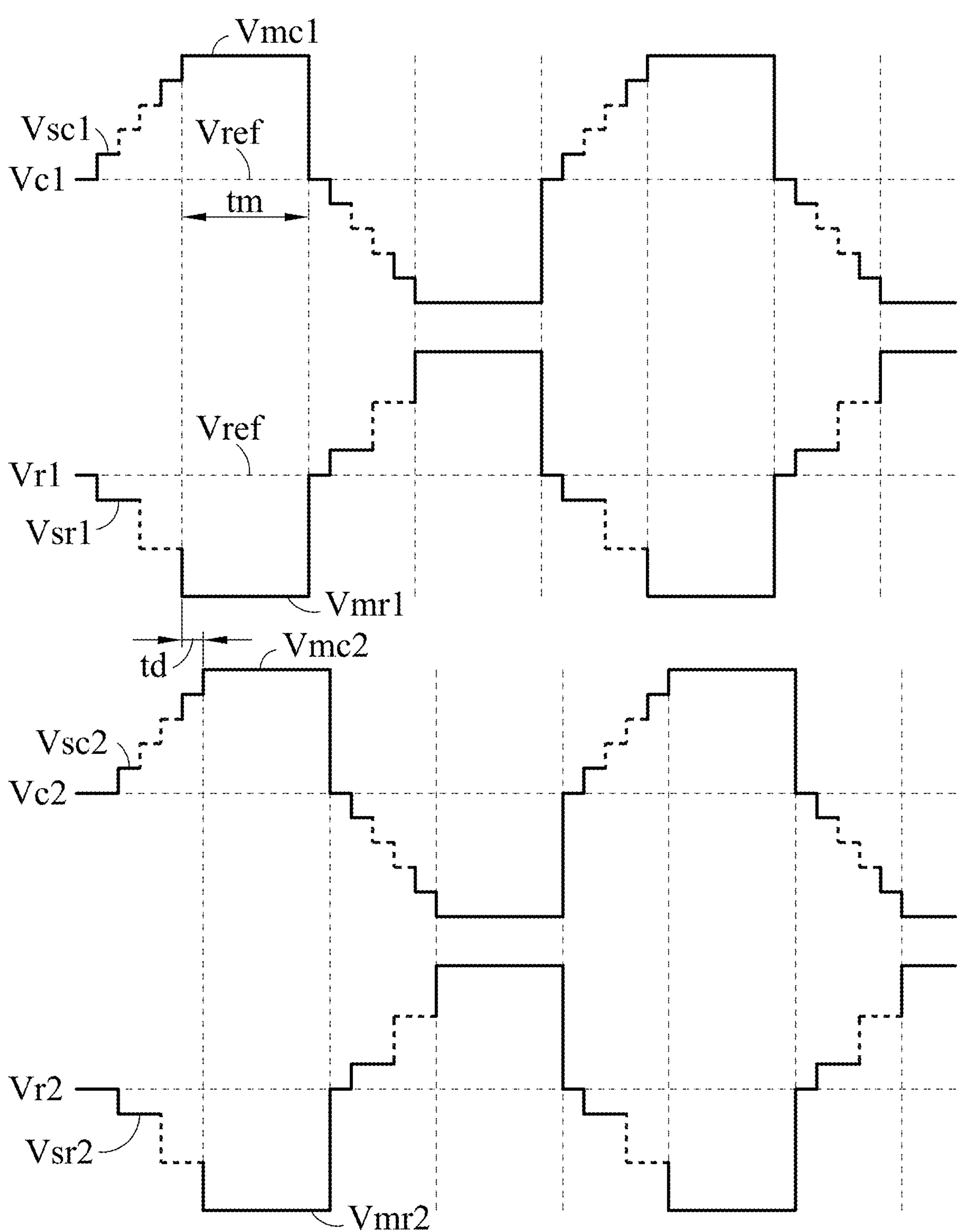
FIG. 4A is a schematic view of column voltages and row voltages of partial resetting sections of a cholesteric liquid crystal display according to the fourth embodiment of the present disclosure.
Figure 4B:
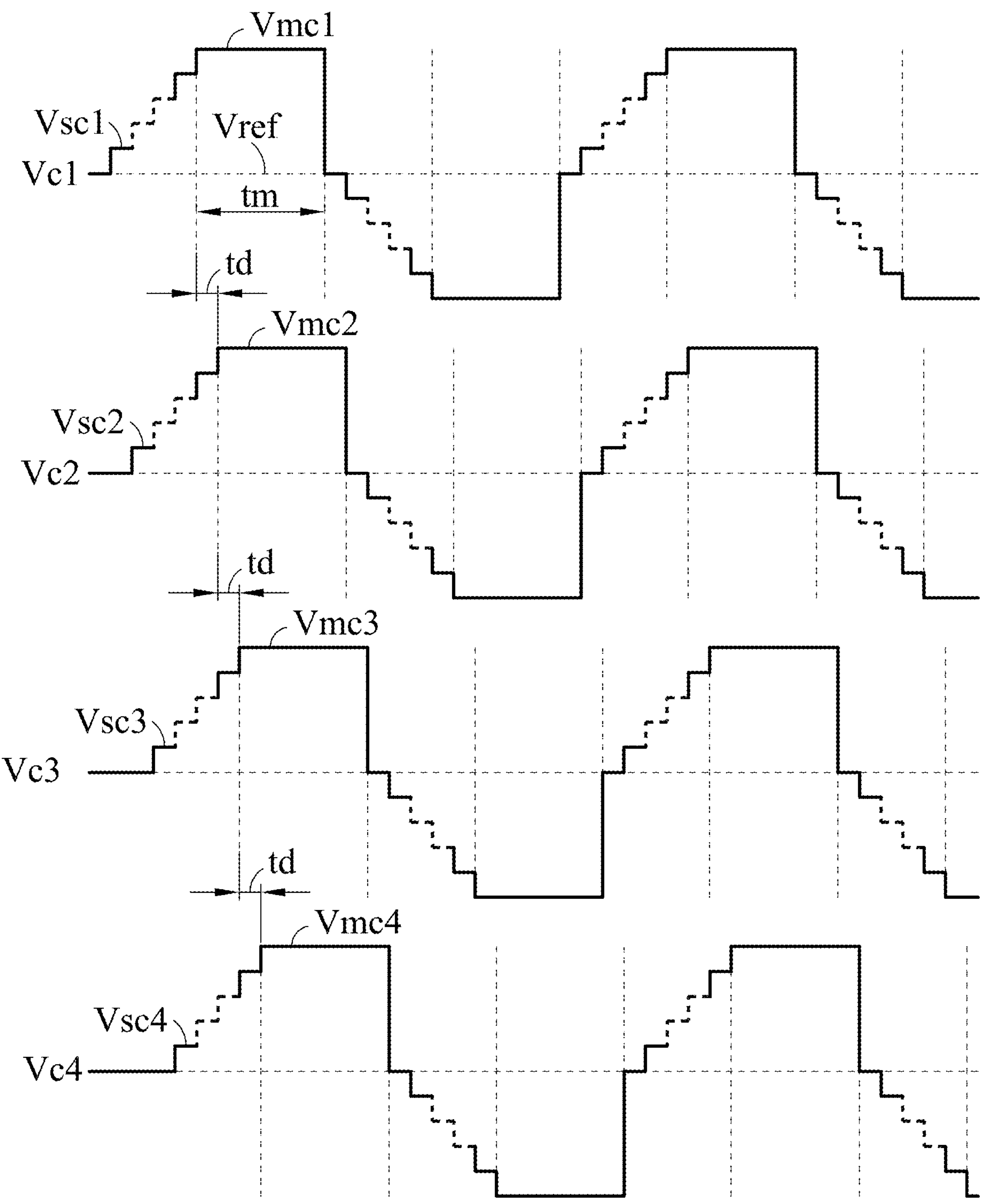
FIG. 4B is a schematic view of a column voltage of the cholesteric liquid crystal display of the fourth embodiment.
Figure 4C:
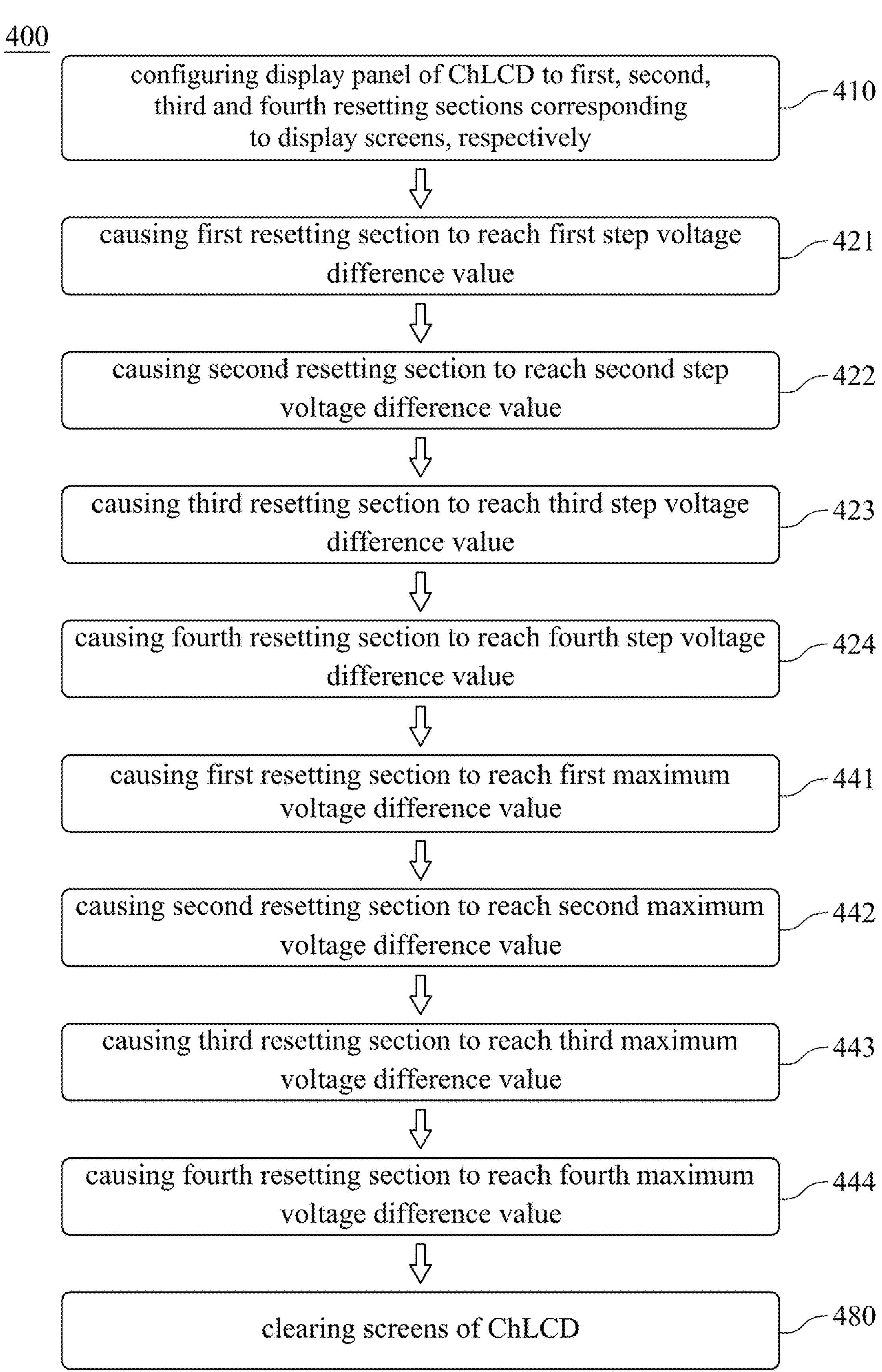
FIG. 4C is a flow chart of a screen clearing method of the cholesteric liquid crystal display of the fourth embodiment.

FIG. 4A is a schematic view of column voltages and row voltages of partial resetting sections of a cholesteric liquid crystal display according to the fourth embodiment of the present disclosure, FIG. 4B is a schematic view of a column voltage of the cholesteric liquid crystal display of the fourth embodiment, and FIG. 4C is a flow chart of a screen clearing method of the cholesteric liquid crystal display of the fourth embodiment. With reference to FIG. 4A to FIG. 4C, the screen clearing method 400 of the cholesteric liquid crystal display specifically includes steps 410, 421, 422, 423, 424, 441, 442, 443, 444, 480.

The step 410 includes configuring the display panel of the cholesteric liquid crystal display to the first resetting section, the second resetting section, the third resetting section and the fourth resetting section. The contents of the aforementioned first embodiment may be referred for other details of first resetting section, the second resetting section, the third resetting section and the fourth resetting section of the fourth embodiment, and the other details will not be described herein.

The step 421 includes forming the first voltage difference between the corresponding column voltage Vc1 and the corresponding row voltage Vr1, and causing the first voltage difference to reach at least one first step voltage difference value. Specifically, the step 421 includes causing the first voltage difference to sequentially reach a plurality of first step voltage difference values.

The step 422 includes forming the second voltage difference between the corresponding column voltage Vc2 and the corresponding row voltage Vr2, and causing the second voltage difference to sequentially reach a plurality of second step voltage difference values.

The step 423 includes forming the third voltage difference between the corresponding column voltage Vc3 and the corresponding row voltage, and causing the third voltage difference to sequentially reach a plurality of third step voltage difference values.

The step 424 includes forming the fourth voltage difference between the corresponding column voltage Vc4 and the corresponding row voltage, and causing the fourth voltage difference to sequentially reach a plurality of fourth step voltage difference values.

The step 441 includes causing the first voltage difference to reach the first maximum voltage difference value, and the first voltage difference reaches the first step voltage difference values (the step 421) before reaching the first maximum voltage difference value. In the fourth embodiment, the fourth voltage difference reaching the first one of the fourth step voltage difference values of the first time is before the first voltage difference reaching the first maximum voltage difference value of the first time, and the present disclosure is not limited thereto.

The step 442 includes causing the second voltage difference to reach the second maximum voltage difference value. Reaching the second maximum voltage difference value of the first time is after reaching the first maximum voltage difference value of the first time by the delay time td, and the second voltage difference reaches the second step voltage difference values (the step 422) before reaching the second maximum voltage difference value.

The step 443 includes causing the third voltage difference to reach the third maximum voltage difference value. Reaching the third maximum voltage difference value of the first time is after reaching the second maximum voltage difference value of the first time by the delay time td, and the third voltage difference reaches the third step voltage difference values (the step 423) before reaching the third maximum voltage difference value.

The step 444 includes causing the fourth voltage difference to reach the fourth maximum voltage difference value. Reaching the fourth maximum voltage difference value of the first time is after reaching the third maximum voltage difference value of the first time by the delay time td, and the fourth voltage difference reaches the fourth step voltage difference values (the step 424) before reaching the fourth maximum voltage difference value.

Furthermore, a number of steps of the first column step voltage values Vsc1 and a number of steps of the first row step voltage values Vsr1 may be the same or different. The second column step voltage values Vsc2, the second row step voltage values Vsr2, the third column step voltage values Vsc3, the third row step voltage values, the fourth column step voltage values Vsc4 and the fourth row step voltage values may be designed accordingly. Each of the first voltage difference reaching the first maximum voltage difference value, the second voltage difference reaching the second maximum voltage difference value, the third voltage difference reaching the third maximum voltage difference value and the fourth voltage difference reaching the fourth maximum voltage difference value may be periodically executed a plurality of times. In the fourth embodiment, the fourth voltage difference reaching the fourth maximum voltage difference value of the first time is before the first voltage difference reaching the first maximum voltage difference value of the second time, and the present disclosure is not limited thereto.

For reaching the first maximum voltage difference value, the second maximum voltage difference value, the third maximum voltage difference value and the fourth maximum voltage difference value of the plurality of times, each of the first maximum column voltage value Vmc1, the first maximum row voltage value Vmr1, the second maximum column voltage value Vmc2, the second maximum row voltage value Vmr2, the third maximum column voltage value Vmc3, the third maximum row voltage value, the fourth maximum column voltage value Vmc4 and the fourth maximum row voltage value relative to the reference voltage value Vref is positive and negative signs alternately.

The step 480 includes clearing the screens of the cholesteric liquid crystal display by reaching the first maximum voltage difference value, the second maximum voltage difference value, the third maximum voltage difference value and the fourth maximum voltage difference value. Therefore, combining time division/section division and multi-stage stepping manners to drive can further suppress the inrush current, so as to ensure the normal operation of the cholesteric liquid crystal display.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A liquid crystal display, comprising:

a display panel comprising a plurality of resetting sections, which correspond to display a plurality of screens, respectively; and a driving unit configured for outputting a plurality of column voltages and a plurality of row voltages, wherein the column voltages and the row voltages correspondingly cooperate to drive the resetting sections, respectively;

wherein there is a first voltage difference between a corresponding one of the column voltages and a corresponding one of the row voltages of one of the resetting sections, there is a second voltage difference between a corresponding one of the column voltages and a corresponding one of the row voltages of another of the resetting sections, and the second voltage difference reaching a second maximum voltage difference value is after the first voltage difference reaching a first maximum voltage difference value by a delay time, so as to clear the screens.

2. The liquid crystal display of claim 1, wherein at least one of the first maximum voltage difference value and the second maximum voltage difference value is a homeotropic voltage.

3. The liquid crystal display of claim 1, wherein a number of the resetting sections is at least four, and the four resetting sections, which respectively correspond to the first voltage difference, the second voltage difference, a third voltage difference and a fourth voltage difference between four corresponding ones of the column voltages and four corresponding ones of the row voltages, sequentially reach the first maximum voltage difference value, the second maximum voltage difference value, a third maximum voltage difference value and a fourth maximum voltage difference value with the delay time, so as to clear the screens.

4. The liquid crystal display of claim 1, wherein one of the screens corresponding to the one of the resetting sections being cleared by reaching the first maximum voltage difference value is before the second voltage difference value reaching the second maximum voltage difference value.

5. The liquid crystal display of claim 1, wherein the first maximum voltage difference value is a difference between a first maximum column voltage value and a first maximum row voltage value.

6. The liquid crystal display of claim 1, wherein the first voltage difference reaches the first maximum voltage difference value after reaching at least one first step voltage difference value, and the second voltage difference reaches the second maximum voltage difference after reaching at least one second step voltage difference value.

7. A screen clearing method of a liquid crystal display, comprising:

configuring a display panel of the liquid crystal display to a plurality of resetting sections, which correspond to display a plurality of screens, respectively, wherein a plurality of column voltages and a plurality of row voltages correspondingly cooperate to drive the resetting sections, respectively;

forming a first voltage difference between a corresponding one of the column voltages and a corresponding one of the row voltages of one of the resetting sections, and causing the first voltage difference to reach a first maximum voltage difference value;

forming a second voltage difference between a corresponding one of the column voltages and a corresponding one of the row voltages of another of the resetting sections, and causing the second voltage difference to reach a second maximum voltage difference value, wherein reaching the second maximum voltage difference value is after reaching the first maximum voltage difference value by a delay time; and clearing the screens by reaching the first maximum voltage difference value and the second maximum voltage difference value.

8. The screen clearing method of the liquid crystal display of claim 7, further comprising:

forming a third voltage difference between a corresponding one of the column voltages and a corresponding one of the row voltages of further another of the resetting sections, wherein the third voltage difference reaching a third maximum voltage difference value is after reaching the second maximum voltage difference value by another delay time.

9. The screen clearing method of the liquid crystal display of claim 7, further comprising:

clearing one of the screens corresponding to the one of the resetting sections by reaching the first maximum voltage difference value before the second voltage difference value reaching the second maximum voltage difference value; and clearing another of the screens corresponding to the another of the resetting sections.

10. The screen clearing method of the liquid crystal display of claim 7, wherein the first voltage difference value reaching the first maximum voltage difference value is periodically executed a plurality of times, and the second voltage difference value reaching the second maximum voltage difference value is periodically executed a plurality of times.

11. A screen clearing method of a liquid crystal display, comprising:

configuring a display panel of the liquid crystal display to a plurality of resetting sections, which correspond to display a plurality of screens, respectively, wherein a plurality of column voltages and a plurality of row voltages correspondingly cooperate to drive the resetting sections, respectively;

forming a first voltage difference between a corresponding one of the column voltages and a corresponding one of the row voltages of one of the resetting sections, and causing the first voltage difference to reach at least one first step voltage difference value before reaching a first maximum voltage difference value;

forming a second voltage difference between a corresponding one of the column voltages and a corresponding one of the row voltages of another of the resetting sections, and causing the second voltage difference to reach a second maximum voltage difference value, wherein reaching the second maximum voltage difference value is after reaching the first maximum voltage difference value by a delay time, and the second voltage difference reaches at least one second step voltage difference value before reaching the second maximum voltage difference value; and clearing the screens by reaching the first maximum voltage difference value and the second maximum voltage difference value.

12. The screen clearing method of the liquid crystal display of claim 11, wherein the at least one first step voltage difference value is a difference between at least one first column step voltage value and at least one first row step voltage value, and a number of steps of the at least one first column step voltage value and a number of steps of the at least one first row step voltage value is the same or different.

* * * * *